US009952687B2

(12) United States Patent
Jiang et al.

(10) Patent No.: US 9,952,687 B2
(45) Date of Patent: *Apr. 24, 2018

(54) APPARATUS FOR IMPLEMENTING TOUCH CONTROL AND FINGERPRINT IDENTIFICATION AND TERMINAL DEVICE COMPRISING SUCH APPARATUS

(71) Applicant: Xiaomi Inc., Beijing (CN)

(72) Inventors: Zhongsheng Jiang, Beijing (CN); Kun Yang, Beijing (CN); Jun Tao, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/987,699

(22) Filed: Jan. 4, 2016

(65) Prior Publication Data
US 2016/0202779 A1    Jul. 14, 2016

(30) Foreign Application Priority Data

Jan. 13, 2015   (CN) .......................... 2015 1 0017101
Jun. 8, 2015    (CN) .......................... 2015 1 0312143

(51) Int. Cl.
*G06K 9/00*    (2006.01)
*G06F 3/0354*  (2013.01)
(Continued)

(52) U.S. Cl.
CPC .......... *G06F 3/03547* (2013.01); *G06F 3/044* (2013.01); *G06F 3/0416* (2013.01);
(Continued)

(58) Field of Classification Search
CPC ............... G06F 3/03547; G06F 3/0488; G06F 2203/0338; G06F 21/32; G06F 3/05; G06K 9/00013; G06K 9/0002
(Continued)

(56) References Cited

U.S. PATENT DOCUMENTS

2010/0279738 A1   11/2010   Kim et al.
2012/0071149 A1    3/2012   Bandyopadhyay et al.
(Continued)

FOREIGN PATENT DOCUMENTS

CN   101901092 A   12/2010
CN   102566840 A    7/2012
(Continued)

OTHER PUBLICATIONS

International Search Report for PCT/CN2015/093304.
Extended European Search Report of EP16151113.4.

*Primary Examiner* — Sam Bhattacharya
(74) *Attorney, Agent, or Firm* — Jun He Law Offices P.C.; James J. Zhu

(57) ABSTRACT

An apparatus for implementing touch control and fingerprint identification includes: a fingerprint identification sensor, a fingerprint identification circuit, a combination switch and a touch control circuit. The fingerprint identification sensor comprises a plurality of sub-sensors. The fingerprint identification sensor transmits a signal generated by detection of the plurality of sub-sensors to the fingerprint identification circuit when the combination switch is open circuited, and combines the signal generated by detection of the plurality of sub-sensors into a touch signal through the combination switch so as to transmit the touch signal to the touch control circuit when the combination switch is closed.

17 Claims, 5 Drawing Sheets

(51) Int. Cl.
*G06F 3/0488* (2013.01)
*G06F 21/32* (2013.01)
*G06F 3/041* (2006.01)
*G06F 3/044* (2006.01)

(52) U.S. Cl.
CPC ............ *G06F 3/0488* (2013.01); *G06F 21/32* (2013.01); *G06K 9/0002* (2013.01); *G06K 9/00013* (2013.01); *G06F 2203/0338* (2013.01)

(58) Field of Classification Search
USPC ............ 455/550.1, 556.1, 566; 345/173–175
See application file for complete search history.

(56) References Cited

U.S. PATENT DOCUMENTS

| | | | |
|---|---|---|---|
| 2012/0105081 A1 | 5/2012 | Shaikh et al. | |
| 2013/0223700 A1 | 8/2013 | Huang et al. | |
| 2013/0287274 A1 | 10/2013 | Shi et al. | |
| 2014/0047706 A1* | 2/2014 | Shaikh | G06K 9/0002 29/622 |
| 2014/0341447 A1 | 11/2014 | Cho et al. | |
| 2014/0359757 A1 | 12/2014 | Sezan et al. | |
| 2015/0185954 A1 | 7/2015 | Chang | |
| 2015/0189136 A1* | 7/2015 | Chung | G06K 9/00013 348/77 |

FOREIGN PATENT DOCUMENTS

| | | | |
|---|---|---|---|
| CN | 103168283 A | 6/2013 | |
| CN | 103294963 A | 9/2013 | |
| CN | 104049828 A | 9/2014 | |
| CN | 104079718 A | 10/2014 | |
| CN | 104252277 A | 12/2014 | |
| CN | 104732201 A | 6/2015 | |
| EP | 1480157 A2 | 11/2004 | |
| JP | 2002297305 A | 10/2002 | |
| JP | 2013517571 A | 5/2013 | |
| JP | 2014142908 A | 8/2014 | |
| KR | 20120116907 A | 10/2012 | |
| RU | 2498390 C2 | 11/2013 | |
| WO | 2014050202 A1 | 4/2014 | |

* cited by examiner

APPARATUS FOR IMPLEMENTING TOUCH CONTROL AND FINGERPRINT IDENTIFICATION AND TERMINAL DEVICE COMPRISING SUCH APPARATUS

CROSS-REFERENCE TO RELATED APPLICATIONS

This application claims priority to Chinese Patent Application 201510312143.0, filed on Jun. 8, 2015, and Chinese Patent Application 201510017101.4, filed on Jan. 13, 2015, the entire contents of which are incorporated herein by reference.

TECHNICAL FIELD

The present disclosure relates to electronic devices, and more particularly, to an apparatus for implementing touch control and fingerprint identification, and a terminal device comprising such apparatus.

BACKGROUND

With more and more functions integrated within terminal devices such as mobile phones, it is more convenient for users to use terminal devices due to the integrated new functions.

All major manufacturers of terminal devices bring their attention fingerprint identification function recently. For conventional terminal devices such as mobile phones, tablet computers, when designing the fingerprint identification function, the fingerprint identification function is generally combined with a physical button, a section view of which is shown in FIG. 1, so as to make the fingerprint identification function compatible with the button. Generally with such design, it is required to form an opening in a fingerprint identification area of a glass cover 01, because a physical button 02 can only be activated through a fixed travel of press. In this way, when a fingerprint identification sensor 03 is tapped by a user, only a fingerprint may be identified by the system. Moreover, when the fingerprint identification sensor 03 is pressed through a certain travel by the user, the physical button 02 may be activated, and two actions including fingerprint sensing and button-press may be identified by the system. Then, a corresponding action may be extracted according to decisions of a upper level processor in the terminal device. However, the exterior appearance of the terminal device is affected by the two-layers structure described above, and the user operation become inconvenient as well.

SUMMARY

There are provided an apparatus for implementing touch control and fingerprint identification and a terminal device comprising such apparatus according to embodiments of the present disclosure.

According to a first aspect of the present disclosure, there is provided an apparatus for implementing touch control and fingerprint identification. The apparatus includes: a fingerprint identification sensor, a fingerprint identification circuit, a combination switch and a touch control circuit. The fingerprint identification sensor includes a plurality of sub-sensors. The plurality of sub-sensors are coupled to the fingerprint identification circuit, respectively, and coupled to the combination switch, respectively. The combination switch is coupled to the touch screen circuit. The fingerprint identification sensor is positioned below a glass cover and occupies a portion of a region below a touch screen, and is configured to transmit a signal generated by detection of the plurality of sub-sensors to the fingerprint identification circuit when the combination switch is open circuited, and to combine the signal generated by the detection of the plurality of sub-sensors into a touch signal through the combination switch so as to transmit the touch signal to the touch control circuit when the combination switch is closed. The fingerprint identification circuit is configured to process the signal generated by the detection of the plurality of sub-sensors; and the touch control circuit is configured to determine presence of a touch operation according to the combined touch signal.

According to a second aspect of e the present disclosure, there is provided a terminal device. The terminal device includes the apparatuses for implementing touch control and fingerprint identification described above.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
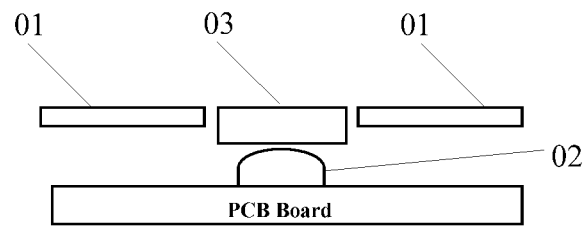
FIG. 1 is a schematic diagram illustrating a section view of a touch screen in a conventional terminal device.
Figure 2:
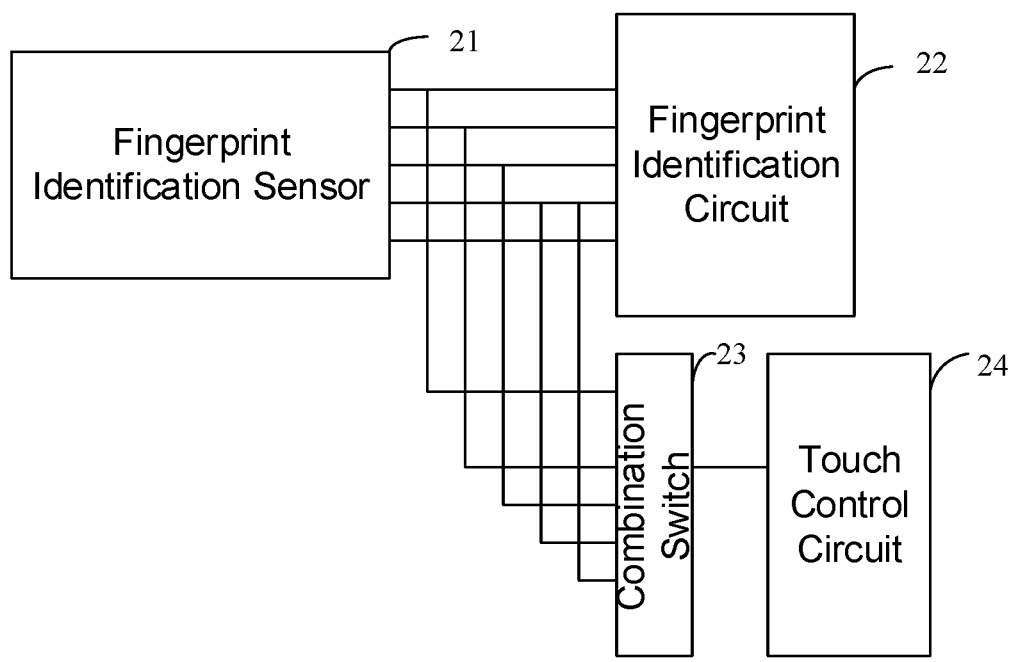
FIG. 2 is a block diagram illustrating an apparatus for implementing touch control and fingerprint identification, according to an exemplary embodiment.

FIG. 2 is a block diagram illustrating an apparatus for implementing touch control and fingerprint identification according to an exemplary embodiment. As shown in FIG.

2, the apparatus includes a fingerprint identification sensor 21, a fingerprint identification circuit 22, a combination switch 23 and a touch control circuit 24, wherein the fingerprint identification sensor 21 includes a plurality of sub-sensors.

The plurality of sub-sensors are coupled to the fingerprint identification circuit 22, respectively, and coupled to the combination switch 23, respectively. The combination switch 23 is coupled to the touch screen circuit 24.

The fingerprint identification sensor 21 is positioned below a glass cover and occupies a portion of a region below a touch screen. The fingerprint identification sensor 21 is configured to transmit a signal generated by detection of the plurality of sub-sensors to the fingerprint identification circuit 22 when the combination switch 23 is open circuited (off). When the combination switch 23 is closed (on), the fingerprint identification sensor 21 combines the signal generated by the detection of the plurality of sub-sensors into a touch signal through the combination switch 23, so as to transmit the touch signal to the touch screen circuit 24.

The fingerprint identification circuit 22 is configured to process the signal generated by the detection of the plurality of sub-sensors.

The touch screen circuit 24 is configured to determine presence of a touch operation according to the combined touch signal.

Figure 3:
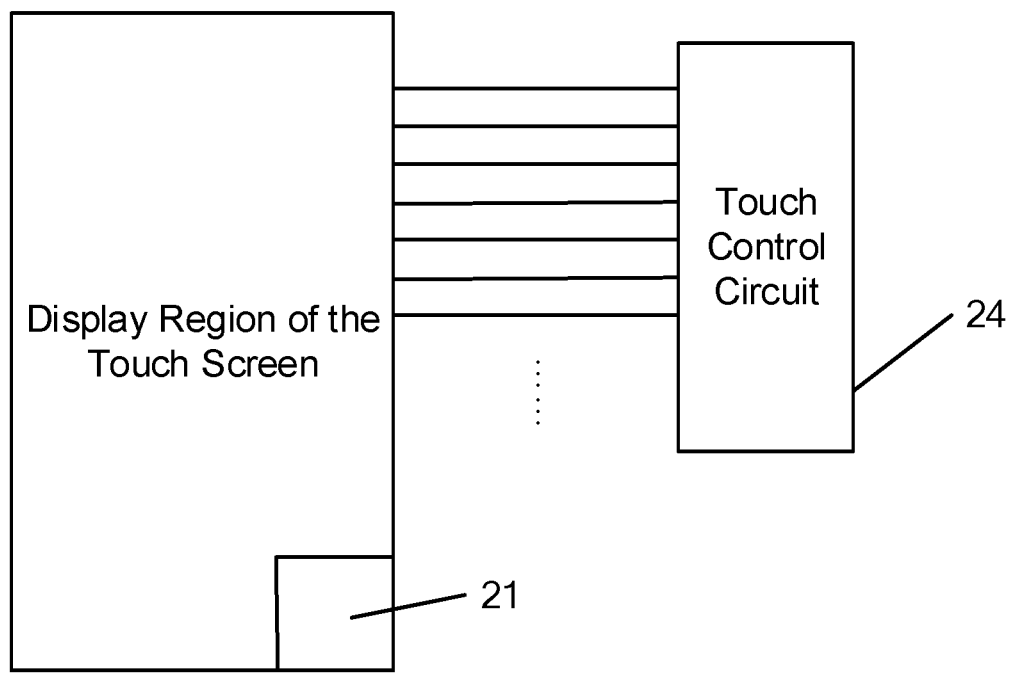
FIG. 3 is a block diagram illustrating a position of the apparatus for implementing touch control and fingerprint identification on a display region of a touch screen according to an exemplary embodiment.

In the embodiment, the fingerprint identification sensor 21 is positioned below the glass cover and occupies a portion of a region below the touch screen, as shown in FIG. 3. In the display region of the touch screen, the fingerprint identification sensor 21 for implementing the functions of fingerprint identification and touch control may be positioned at an area of the lower right region of the touch screen.

In an embodiment, the fingerprint identification sensor 21 is formed of metallic nano-wire or carbon nano-tube material. As the fingerprint identification sensor 21 is located in a portion of a region below the touch screen, and it is required to take into account the optical effects and the strict requirements of fingerprint identification on the line width and line spacing of the sensors, the fingerprint identification sensor 21 may be substantially transparent, for example, by forming it using materials such as metallic nano-wire, carbon nano-tube or the like. In this way, it is possible to realize the capacitive touching and fingerprint identification functions in a time-division manner.

Figure 4:
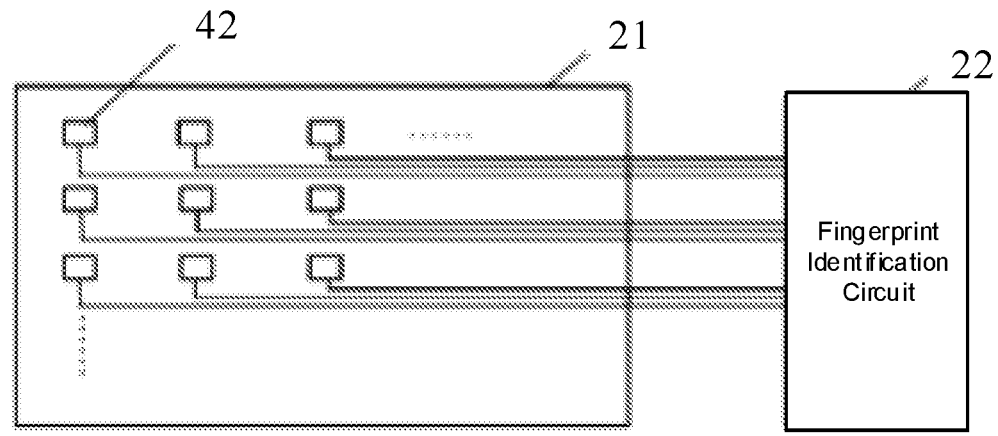
FIG. 4 is a block diagram illustrating a fingerprint identification mechanism with sub-sensors arranged in a dot array according to an exemplary embodiment.
Figure 5:
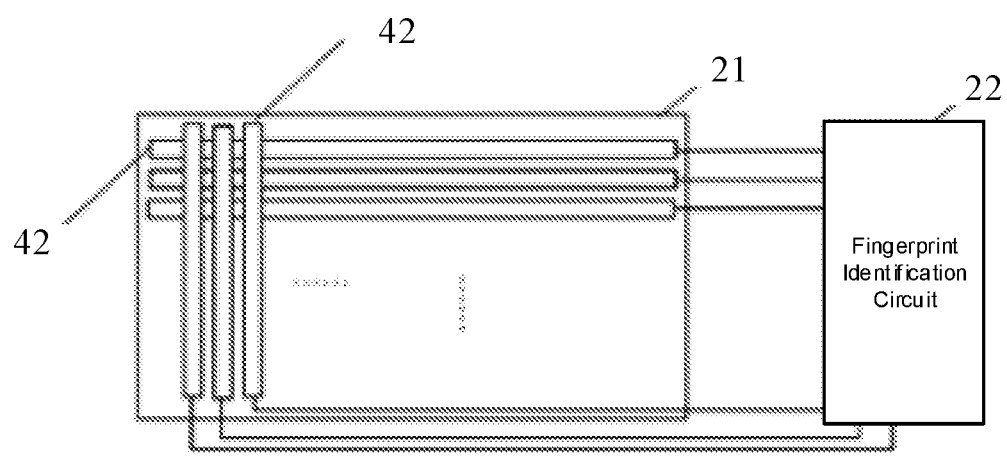
FIG. 5 is a block diagram illustrating a fingerprint identification mechanism with sub-sensors arranged in a rectangular array according to an exemplary embodiment.

In an embodiment, as shown in FIGS. 4 and 5, the plurality of sub-sensors are arranged in a dot array or in a rectangular array.

The fingerprint identification sensor includes a plurality of sub-sensors 42 (for example, one fingerprint identification sensor may include more than one thousand sub-sensors), which are configured to collect subtle information of various key points of a fingerprint. Thus, a complete or partial fingerprint image may be restored based on the information of those key points, such that the fingerprint image can be compared with a sample image to determine whether they are consistent with each other.

The signal indicative of the fingerprint information is transmitted to the fingerprint identification circuit 22 from the array of sub-sensors, either in the dot array or in the rectangular array, and is then processed by signal filtering, amplification, AD sampling and the like. In this way, a digital signal with sufficient fingerprint information can be provided to a fingerprint identification chip. Accordingly, when the combination switch 23 is open circuited, the signal generated by detection of the respective sub-sensors 42 is transmitted from the fingerprint identification sensor 21 to the fingerprint identification circuit 22 so as to implement the function of fingerprint identification. Otherwise, when the combination switch 23 is closed, the signal generated by the detection of the respective sub-sensors 42 of the fingerprint identification sensor 21 is combined via the combination switch 23 into a touch signal, which is to be transmitted to the touch control circuit 24. Thus, the signal with sufficient energy can be provided to the touch control circuit 24, which can satisfy the requirements of finger touching on sensitivity, response area and response speed. Accordingly, in this situation, the fingerprint identification sensor 21 is able to receive touch signal and act as a "touch key" to achieve the function of a "physical button".

Figure 6:
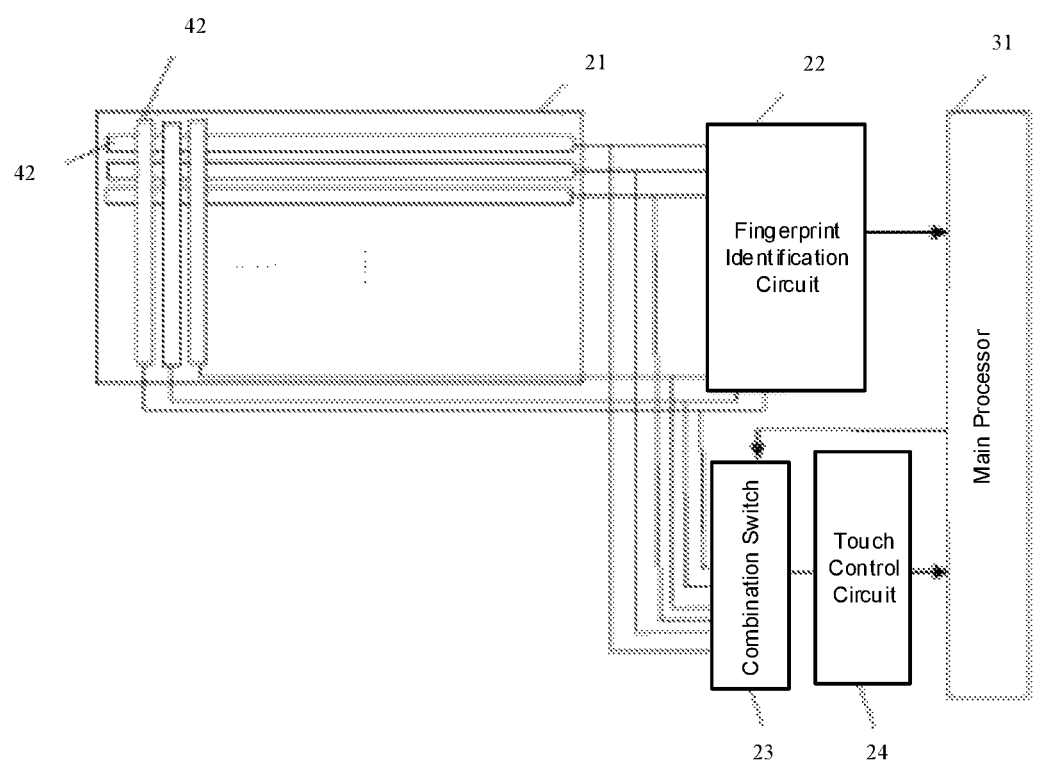
FIG. 6 is a block diagram illustrating an apparatus for implementing touch control and fingerprint identification according to an exemplary embodiment.

FIG. 6 is a block diagram illustrating an apparatus for implementing touch control and fingerprint identification according to an exemplary embodiment. As shown in FIG. 6, the apparatus includes a fingerprint identification sensor 21, a fingerprint identification circuit 22, a combination switch 23 and a touch control circuit 24, wherein the fingerprint identification sensor 21 includes a plurality of sub-sensors 42 which are arranged in a rectangular array. As shown in FIG. 4, the plurality of sub-sensors 42 may be also arranged in a dot array.

In the present embodiment, the functions of fingerprint identification and capacitive touching are implemented by adding an additional capacitive touching mechanism other than a fingerprint identification mechanism, wherein the capacitive touching mechanism and the fingerprint identification mechanism share the sensor.

The combination switch 23 is open circuited or closed according to instruction from a main processor 31 in the terminal device. When the main processor 31 requires to identify a fingerprint (for example, when the terminal device displays a user interface to ask a user to input his fingerprint), the combination switch 23 is open circuited, and the signals from the respective sub-sensors 42 may be obtained by the fingerprint identification circuit 22 so as to implement the fingerprint identification function. Otherwise, when the main processor 31 requires to sense a finger touch (for example, when the terminal device is operated with an application which needs a user to input a touch control signal), the combination switch 23 is closed and all of the sub-sensors 42 are combined into a bigger sensing component through which a finger touch signal may be obtained by the touch control circuit 24, so as to implement the finger touch control function. According to the requirement of the upper level processor, such as a main processor 31, the respective sub-sensors may be combined into the bigger sensing component to provide the touch control circuit 24 with a signal of sufficient energy level, and the sensitivity, response area and response speed required by the finger touch control function can be ensured.

In an embodiment, the fingerprint identification circuit 22 may include a signal processing sub-module configured to convert the signal generated by detection of the plurality of sub-sensors 42 into a digital signal and transmit the digital signal to the main processor 31 in the terminal device.

For example, the signal generated by detection of the plurality of sub-sensors 42 may be processed by filtering, amplification, sampling and the like.

In an embodiment, the fingerprint identification circuit 22 may include an image generation sub-module configured to generate a fingerprint image based on the signal generated by the detection of the plurality of sub-sensors 42 and transmit the fingerprint image to the main processor 31 in the terminal device.

In an embodiment, the fingerprint identification circuit 22 may include a comparison sub-module configured to generate a fingerprint image based on the signal generated by the detection of the plurality of sub-sensors 42, compare the fingerprint image with a sample image and transmit a comparison result to the main processor 31 in the terminal device.

In an embodiment, the touch control circuit 24 may include a determination sub-module configured to determine presence of the touch operation according to the combined touch signal and transmit a determination result to the main processor 31 in the terminal device.

With the technical solutions provided by the present disclosure, the functions of fingerprint identification and touch control can be implemented by sharing a fingerprint identification sensor. External components for implementing fingerprint identification and touch control can be integrated into a single component, so that the integration level of an electronic device is improved. Accordingly, both the capacitive touching and the fingerprint identification function can be realized in the display area, which improves the convenience of operation and the user experience.

In the present disclosure, separate ICs (Integrated Circuits) can be used for processing signals but the sensor can be shared, as shown in the drawings described above. Moreover, various components can be integrated together. For example, the combination switch 23 and the touch control circuit 24 may be integrated into a single IC, the combination switch 23 and the fingerprint identification circuit 22 may be integrated into a single IC, or the combination switch 23, the fingerprint identification circuit 22 and the touch control circuit 24 may be integrated into a single IC, so as to provide a highly integrated solution.

Figure 7:
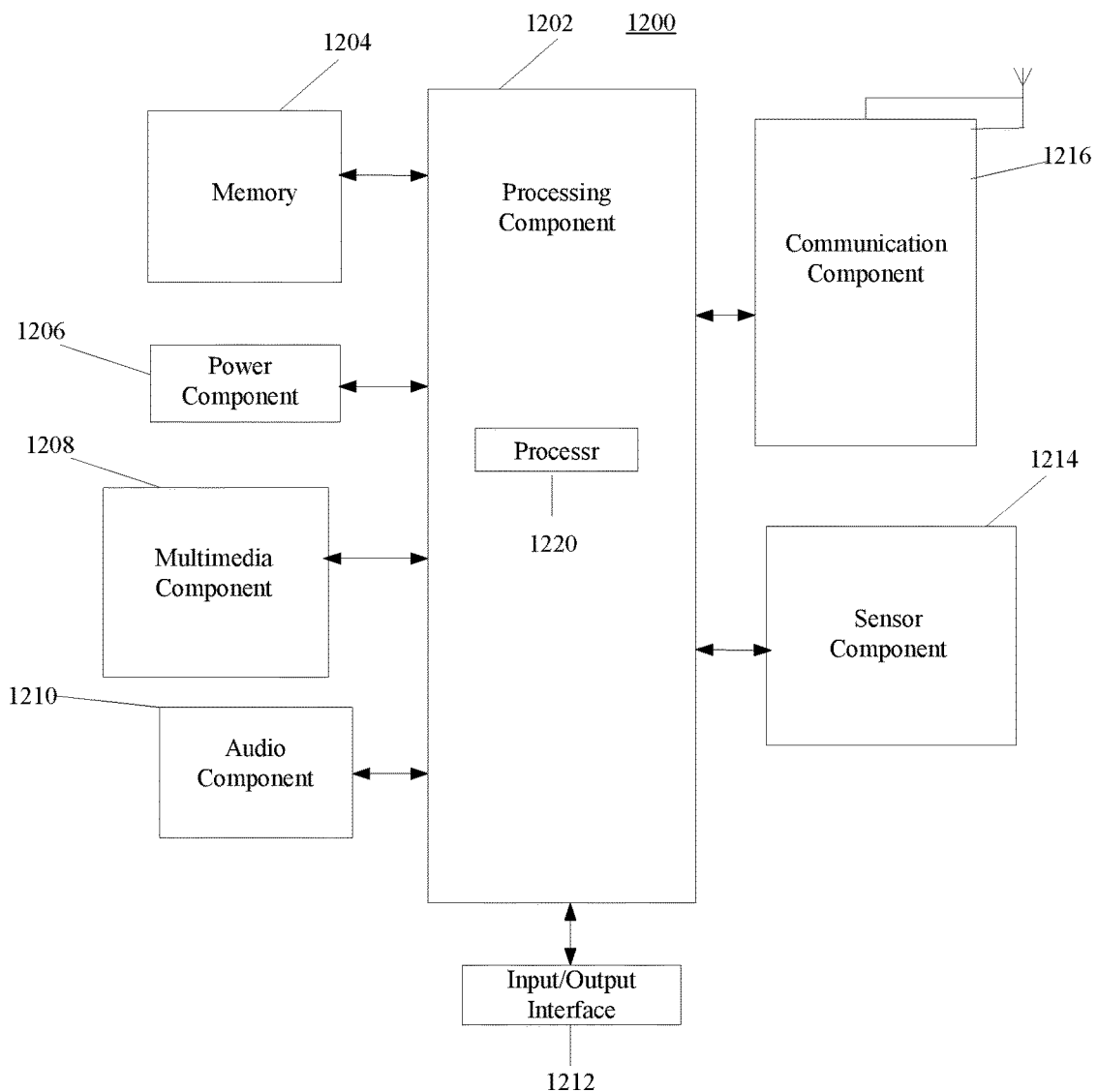
FIG. 7 is a block diagram illustrating a terminal device for implementing touch control and fingerprint identification according to an exemplary embodiment.

FIG. 7 is a block diagram illustrating a terminal device 1200 for implementing touch control and fingerprint identification. According to the present disclosure, the terminal device 1200 may include the apparatuses for implementing touch control and fingerprint identification described above. For example, the terminal device 1200 may be a mobile phone, a computer, a digital broadcast terminal, a messaging device, a gaming console, a tablet device, a medical device, exercise equipment, a personal digital assistant, and the like.

Referring to FIG. 7, the terminal device 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the terminal device 1200, such as the operations associated with display, telephone calls, data communications, camera operations, and recording operations. The processing component 1202 may include one or more processors 1220 to perform as the main processor to communicate with the apparatuses for implementing touch control and fingerprint identification described above. Moreover, the processing component 1202 may include one or more modules which facilitate the interaction between the processing component 1202 and other components. For instance, the processing component 1202 may include a multimedia module to facilitate the interaction between the multimedia component 1208 and the processing component 1202.

The memory 1204 is configured to store various types of data to support the operation of the terminal device 1200. Examples of such data include instructions for any applications or methods operated on the terminal device 1200, contact data, phonebook data, messages, pictures, video, etc.

The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the terminal device 1200. The power component 1206 may include a power management system, one or more power sources, and any other components associated with the generation, management, and distribution of power in the terminal device 1200.

The multimedia component 1208 includes a screen providing an output interface between the terminal device 1200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1208 includes a front camera and/or a rear camera. The front camera and the rear camera may receive an external multimedia datum while the terminal device 1200 is in an operation mode, such as a photographing mode or a video mode. Each of the front camera and the rear camera may be a fixed optical lens system or have focus and optical zoom capability.

The audio component 1210 is configured to output and/or input audio signals. For example, the audio component 1210 includes a microphone ("MIC") configured to receive an external audio signal when the terminal device 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, such as a keyboard, a click wheel, buttons, and the like. The buttons may include, but are not limited to, a home button, a volume button, a starting button, and a locking button.

The sensor component 1214 includes one or more sensors to provide status assessments of various aspects of the terminal device 1200. For instance, the sensor component 1214 may detect an open/closed status of the terminal device 1200, relative positioning of components, e.g., the display and the keypad, of the terminal device 1200, a change in position of the terminal device 1200 or a component of the terminal device 1200, a presence or absence of user contact with the terminal device 1200, an orientation or an acceleration/deceleration of the terminal device 1200, and a change in temperature of the terminal device 1200. The sensor component 1214 may include a proximity sensor configured to detect the presence of nearby objects without any physical contact. The sensor component 1214 may also include a light sensor, such as a CMOS or CCD image sensor, for use in imaging applications. In some embodiments, the sensor component 1214 may also include an accelerometer sensor, a gyroscope sensor, a magnetic sensor, a pressure sensor, or a temperature sensor.

The communication component 1216 is configured to facilitate communication, wired or wirelessly, between the terminal device 1200 and other devices. The terminal device 1200 can access a wireless network based on a communication standard, such as WiFi, 2 G, or 3 G, or a combination thereof. In one exemplary embodiment, the communication component 1216 receives a broadcast signal or broadcast associated information from an external broadcast management system via a broadcast channel. In one exemplary embodiment, the communication component 1216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal device 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1204, executable by the processor 1220 in the terminal device 1200, for performing the above-described methods. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. An apparatus for implementing touch control and fingerprint identification, comprising: a fingerprint identification sensor, a fingerprint identification circuit, a combination switch and a touch control circuit, wherein
    the fingerprint identification sensor comprises a plurality of sub-sensors; the plurality of sub-sensors are coupled to the fingerprint identification circuit, respectively, and coupled to the combination switch, respectively; and the combination switch is coupled to the touch control circuit;
    the fingerprint identification sensor is positioned below a glass cover and occupies a portion of a region below a touch screen, and the fingerprint identification sensor is configured to transmit a signal generated by detection of the plurality of sub-sensors to the fingerprint identification circuit when the combination switch is open circuited, and to combine the signal generated by the detection of the plurality of sub-sensors into a touch signal through the combination switch so as to transmit the touch signal to the touch control circuit when the combination switch is closed;
    the fingerprint identification circuit is configured to process the signal generated by the detection of the plurality of sub-sensors; and
    the touch control circuit is configured to determine presence of a touch operation according to the combined touch signal.

2. The apparatus of claim 1, wherein the combination switch is open circuited or closed according to an instruction from a main processor in a terminal device.

3. The apparatus of claim 1, wherein the fingerprint identification sensor is formed of metallic nano-wire or carbon nano-tube material.

4. The apparatus of claim 1, wherein the plurality of sub-sensors are arranged in a dot array or in a rectangular array.

5. The apparatus of claim 1, wherein the fingerprint identification circuit comprises:
    a signal processing sub-module configured to convert the signal generated by the detection of the plurality of sub-sensors into a digital signal and transmit the digital signal to a main processor in a terminal device.

6. The apparatus of claim 1, wherein the fingerprint identification circuit comprises:
    an image generation sub-module configured to generate a fingerprint image based on the signal generated by the detection of the plurality of sub-sensors and transmit the fingerprint image to a main processor in a terminal device.

7. The apparatus of claim 1, wherein the fingerprint identification circuit comprises:
    a comparison sub-module configured to generate a fingerprint image based on the signal generated by the detection of the plurality of sub-sensors, compare the fingerprint image with a sample image and transmit a comparison result to a main processor in a terminal device.

8. The apparatus of claim 1, wherein the touch control circuit comprises:
    a determination sub-module configured to determine the presence of the touch operation according to the combined touch signal and transmit a determination result to a main processor in a terminal device.

9. A terminal device, comprising the apparatus for implementing touch control and fingerprint identification according to claim 1.

10. The terminal device of claim 9, wherein the combination switch is open circuited or closed according to an instruction from a main processor in the terminal device.

11. The terminal device of claim 9, wherein the fingerprint identification sensor is formed of metallic nano-wire or carbon nano-tube material.

12. The terminal device of claim 9, wherein the plurality of sub-sensors are arranged in a dot array or in a rectangular array.

13. The terminal device of claim 9, wherein the fingerprint identification circuit comprises:
    a signal processing sub-module configured to convert the signal generated by the detection of the plurality of sub-sensors into a digital signal and transmit the digital signal to a main processor in the terminal device.

14. The terminal device of claim 9, wherein the fingerprint identification circuit comprises:

an image generation sub-module configured to generate a fingerprint image based on the signal generated by the detection of the plurality of sub-sensors and transmit the fingerprint image to a main processor in the terminal device.

15. The terminal device of claim 9, wherein the fingerprint identification circuit comprises:
a comparison sub-module configured to generate a fingerprint image based on the signal generated by the detection of the plurality of sub-sensors, compare the fingerprint image with a sample image and transmit a comparison result to a main processor in the terminal device.

16. The terminal device of claim 9, wherein the touch control circuit comprises:
a determination sub-module configured to determine the presence of the touch operation according to the combined touch signal and transmit a determination result to a main processor in the terminal device.

17. An apparatus for implementing touch control and fingerprint identification, comprising:
a fingerprint identification circuit;
a touch control circuit;
a combination switch coupled to the touch control circuit; and
a fingerprint identification sensor positioned below a glass cover and occupying a portion of a region below a touch screen, the finger identification sensor comprising a plurality of sub-sensors coupled to the fingerprint identification circuit, respectively and coupled to the combination switch, respectively, wherein the fingerprint identification sensor is configured to:
transmit signals generated by the plurality of sub-sensors to the fingerprint identification circuit respectively for processing when the combination switch is open circuited; and
transmit a touch signal to the touch control circuit for determining presence of a touch operation when the combination switch is closed, the touch signal being obtained by combining signals generated by the plurality of sub-sensors through the combination switch.

* * * * *